[54] PROCESS FOR THE PRODUCTION OF A CERAMIC POLYCRYSTALLINE ABRASIVE

[75] Inventors: Günter Bartels, Reinbek; Günter Becker, Hamburg; Eckhard Wagner, Elmshorn, all of Fed. Rep. of Germany

[73] Assignee: Norddeutsche Schleifmittel-Industrie Christiansen & Co. (GmbH & Co.), Hamburg, Fed. Rep. of Germany

[21] Appl. No.: 545,091

[22] Filed: Jun. 27, 1990

Related U.S. Application Data

[63] Continuation of Ser. No. 355,119, May 19, 1989, which is a continuation of Ser. No. 120,194, Nov. 4, 1987, abandoned, which is a continuation of Ser. No. 884,473, Jul. 11, 1986, abandoned.

[30] Foreign Application Priority Data

Jul. 15, 1985 [DE] Fed. Rep. of Germany ....... 3525175

[51] Int. Cl.$^5$ ............................................. C04B 35/10
[52] U.S. Cl. .................................. 501/127; 501/153; 423/629; 252/315.7
[58] Field of Search ................ 501/127, 153; 423/629; 252/315.7; 51/309, 293

[56] References Cited

U.S. PATENT DOCUMENTS

| | | |
|---|---|---|
| 3,454,385 | 7/1969 | Amero .................................. 51/298 |
| 3,808,015 | 4/1974 | Seufert ................................. 501/127 |
| 4,051,222 | 9/1977 | Gnyra .................................. 423/127 |
| 4,574,003 | 3/1986 | Gerk .................................... 51/309 |
| 4,595,581 | 6/1986 | Misra et al. ......................... 423/625 |
| 4,610,866 | 9/1986 | Debsikdar et al. ................. 423/600 |

FOREIGN PATENT DOCUMENTS

| | | |
|---|---|---|
| 22650 | 11/1970 | Australia . |
| 0024099 | 2/1981 | European Pat. Off. . |
| 2108949 | 5/1983 | European Pat. Off. ............. 423/629 |
| 152768 | 8/1985 | European Pat. Off. ............. 501/127 |
| 168606 | 1/1986 | European Pat. Off. ............. 501/127 |
| 2145545 | 3/1972 | Fed. Rep. of Germany ...... 501/153 |
| 49-69709 | 7/1974 | Japan ................................... 501/127 |
| 298569 | 3/1971 | U.S.S.R. .............................. 501/153 |

OTHER PUBLICATIONS

Roy, Suwa, Komarneni: Nucleation and Epitaxial Growth in Diphasic (Crystalline+Amorphes) Gels--Science of Issued in Science of Ceramic Chemical Processing, New York 1986, pp. 259-271.

McArdle et al, "Seeding with $\gamma$Alumina for Transformation and Microstructure Control in Boehmite-Derived $\alpha$-Alumina", J. Am. Ceram Soc., 69(5), 98-101 (1986).

Kumagai et al, "Enhanced Densification of Boehmite Sol-Gels by $\alpha$-Alumina Seeding", Communications of Am. Ceramic Soc., 230-231 (1984).

*Primary Examiner*—William R. Dixon, Jr.
*Assistant Examiner*—Sue Hollenbeck
*Attorney, Agent, or Firm*—Chilton, Alix & Van Kirk

[57] ABSTRACT

A process for the production of a ceramic polycrystalline abrasive by the sol/gel method is characterized in that an intermediate containing aluminium hydroxide is mixed, dried, calcined and sintered with a further intermediate having different degradation properties. The further intermediate is expediently formed from a calcined aluminium hydroxide.

20 Claims, No Drawings

PROCESS FOR THE PRODUCTION OF A CERAMIC POLYCRYSTALLINE ABRASIVE

This is a continuation of co-pending application Ser. No. 07/355,119, filed May 19, 1989, which is a continuation of Ser. No. 07/120, 194, filed Nov. 4, 1987, now abandoned, which is a continuation of Ser. No. 06/884,473 filed July 11, 1986, now abandoned.

DESCRIPTION

The invention relates to a process for the production of a ceramic polycrystalline corundum abrasive by dispersing a first intermediate containing an aluminum hydroxide and at least one further intermediate in water, dewatering, calcining and sintering.

In addition to abrasives made from fused corundum, abrasives made from sintered material which posses certain technical advantages as regards both their production and use as abrasives, are known. In particular, their microcrystalline structure and composition to influence toughness and hardness as well as the tribochemical and tribophysical properties, can be determined comparatively well in advance. To achieve an as great as possible hardness, a crystal structure as fine-grated as possible is preferred, this being attainable by the thermal conditions of the process and by additives such as magnesium which are mainly to be found at the particle boundaries. Those abrasives which have largely been successful here are those consisting to a decisive degree of zirconia besides alumina, the zirconia crystallites being embedded in a matrix consisting of alumina (European Patent B 0,024,099). Abrasives which are composed in this manner of different crystallites, in general exhibit better properties than those which consist exclusively of one or other material; this may be linked to the finding that a bidisperse structure offers a greater resistance to the propagation of microcracks than a highly uniform structure. However, the composition of the particles of abrasive derived from crystallites of different substances has also disadvantages which are founded on different thermal expansion characteristics of the different crystallites and the comparatively high cost of zirconia. For this reason abrasives consisting essentially exclusively of alumina, have been also produced by sintering, the required grain properties being achieved by adding very finely ground alpha-alumina to the sintering material as crystal nuclei. The great degree of fineness and the required fine distribution of the alpha-alumina pose, however, significant problems the solution of which presupposes the use of, for example, corundum mills (European Patent A 0,152,768).

The object of the invention therefore is to provide a process of the type referred to at the outset, which is cost-effective, can be readily carried out in a constantly controllable manner and leads to good technical properties of the product for use as abrasive.

The solution according to the invention consists of the further intermediate containing an aluminum hydroxide with degradation properties different from those of the first intermediate.

In this connection the term aluminum hydroxide is intended to include all the forms of the true hydroxides including all degradation forms containing water (metahydroxides). It is known that in the dehydration of aluminum hydroxide various degradation products, exhibiting different reactivity, can be distinguished. Which forms appear in a particular degradation series and in what temperature range, depends not only on the starting products but also on pressure and temperature conditions and on additives. Whilst, for example, diaspor is directly transformed by loss of water through adequate heating into corundum (alpha-alumina), there are obtained, starting from amorphous gels, bayerite and hydrargillite, various aluminum hydroxides, in particular boehmite, and subsequently degradation products with a non-stoichiometric water content, in the so-called gamma series until this series too is transformed into corundum. In is thus clear that the final crystal structure formed under given pressure and temperature conditions is influenced by the length of time for which the particular formative intermediates of the crystallites and polycrystals had been in a given modification state. When different crystallites and polycrystals or their earlier stages have assumed during the dehydration different modifications and thus been subject to different conditions of growth, a different proportion of foreign ions and/or a different chemical transformation or physical nature of the crystal boundary regions can result in the end product. The invention makes use of this phenomenon in that it starts in the sol-gel process from the dispersion of different aluminum hydroxides which consequently exhibit degradation characteristics different from each other and lead to different microstructures in the end product. The different properties of the crystallites and polycrystals result in a distinct inhibition of microcrack propagation owing to increased dissipative energy and thus in an increase in toughness without a reduction in hardness. The ability of influencing abrasive properties by additives is not affected.

A first possibility of realising this principle consists in starting from different hydroxides or metahydroxides in making up the dispersion, for example a mixture of boehmite and diaspor. The use of different degradation stages in preferred; for example the dispersion preceding gel formation can contain boehmite on the one hand and a gamma form containing a smaller amount of water on the other. The latter preferably belongs to a degradation stage which is no longer readily fully convertible into Al(OH)$_3$ under the chemical, physical and thermal conditions prevalent in the dispersion. It is not a condition that such a conversion should no longer be possible at all; on the contrary, the purpose is merely to ensure that the further intermediate retains to a substantial degree, before and during the gel formation, a crystallographic state different from that of the first intermediate, in order that a different reactivity and a different degradation behaviour are generated by it.

This objective can be achieved according to the invention particularly simply by using calcined aluminum hydroxide for the further intermediate, this being obtainable from the same basic form as the first intermediate. An aluminum hydroxide calcined between 450° and 900° C., preferably between 550° and 850° C. to give metastable gamma-aluminum-oxide, (which is considered an aluminum hydroxide within the meaning of the term as used herein), which has been expediently obtained from a boehmite type, is particularly used. The further intermediate can preferably consist exclusively of this material or contain additional aluminum hydroxides or other substances.

The further intermediate is expediently dispersed with the first intermediate before the gel state is reached.

Instead, however, it is also possible to mix a sol or gel of the first intermediate with a dispersion of the further intermediate. When a calcined aluminum hydroxide is used for the further intermediate, it is expediently finely ground after calcining, since the particle size of the calcined material affects the size of the polycrystals in the end product.

The first and the further intermediates are expediently mixed in such proportion that their alumina contents measured water-free are in the ratio from 99:1 to 1 to 80:20, preferably from 97.5:2.5 to 90:10.

An essential advantage of the process according to the invention lies in the fact that essentially pure alumina abrasives can be produced with structural properties which to a large extent can be determined in advance. It is therefore expedient for the metal proportion in all the intermediates to amount to at least 90%, and better to at least 99% aluminum.

However, the process according to the invention has proven its worth also when other substances, especially magnesium which should be in a form convertible to magnesium aluminate spinel, are present.

In one expedient embodiment only one of the two intermediates contains magnesium, preferably the further intermediate. However, the magnesium can be also provided in the first intermediate.

In another embodiment of the invention both intermediates can contain magnesium.

The magnesium contained in the further intermediate is present after calcination in the form of a spinal or a spinal precursor, mutual penetration of the crystal structures occurring to at least some extent because of the crystallographic similarly between magnesia and gamma-aluminum-oxide and having its effects in later steps of the process.

When the first intermediate contains magnesium, this is expediently added before or during the mixing of the two intermediates.

In any case it is expediently added to the dispersions in a form suitable for flocculation and gel formation of the alumina, preferably as the nitrate.

The total magnesium content of all the intermediates is expediently chosen such that the molar ratio of MgO to $Al_2O_3$ in the sintered product is at least 0.1. When the magnesium was contained in only one of the two intermediates, it is not distributed uniformly in the end product but is located there exclusively or mainly in those crystallites or polycrystals that have resulted from the magnesium-containing intermediate.

It has been established that the process according to the invention is suitable not only for the relatively low, known spinel contents in abrasives, but also for substantially higher ones. Thus a product with very good abrasive properties is obtained when the total magnesium content of all the intermediates corresponds to a magnesium aluminate spinel content in the sintered product of at least 50% by weight, preferably even of at least 70% by weight. Essentially, the complete product can in fact be produced in spinel form.

The invention does not preclude other intermediates in the sol-gel technique being processed besides the two intermediates mentioned. The above observations can be applied to such cases by considering any two of the used intermediates or by combining at any one time two intermediates into one intermediate in the sense of the above observations.

The gel obtained from the two intermediates in transformed to a form suitable for drying, for example plates. It can also be very expedient to extrude it, advantageously in a crude cross-section corresponding to the abrasive grain cross-section desired. The gel is carefully dried according to customary techniques. Other dewatering methods can be used prior to gel formation, for example the dispersion can be centrifuged. This does not have to take place only after combining the two intermediates; on the contrary, these can be dispersed separately and partially dewatered, before being mixed in a still liquid or paste-like form, for example in an extruder.

The aim should be to attain the gel state in at least the first intermediate (including the dispersed second intermediate). However, it is unnecessary to reach the gel state completely.

The dry gel can be broken up and classified to particle size by pre-sieving, providing shrinkage in the subsequent calcination and sintering. The resultant residual gel can be reconstituted by addition of water to a gel which can be returned to the process. The pre-sieved, grainy dry gel is calcined in the temperature range between 450° and 900°, preferably between 550° and 850° C., for about one hour. The calcined particles can be placed directly or after intermediate cooling to 20° to 50° C. into a sintering oven heated above 1250° C., preferably between 1350° and 1450° C., and sintered there for 5 to 90 minutes, preferably for 20 to 60 minutes. When the calcined gel has been subjected to intermediate cooling, the crushing and classification by particle size can be also carried out in this stage of the process (instead of after drying the gel). The sintered abrasive grain are expediently rapidly cooled, and after being cooled to room temperature, they are classified according to shape and standard size by sieving or sedimentation.

The process parameters referred to above can be modified in the light of the plentiful experience accumulated within the state of technology.

For making up the dispersions, commercial, readily dispersible, very pure aluminum metahydroxide of the boehmite type containing a maximum of 0.025% of $SiO_2$, 0.02% of $Fe_2O_3$ and 0.005% of $Na_2O$ is expediently used. The sol/gel formation and the fine crystallinity of the product are promoted by a large specific surface area which is expediently above 100 $m^2/g$, preferably above 150 $m^2/g$.

The dispersion and the sol/gel formation can be promoted by the usual means, for example by using nitric acid in a concentration of 0.05 to 0.25 mol/l.

When magnesium is to be added, this takes expediently place in the form of a magnesium salt (for example magnesium nitrate) when the two intermediates are being mixed, i.e. after calcination of the aluminum hydroxide of the further intermediate. When, however, the particle growth in the further intermediate is to be limited already during its calcination, the magnesium can be added totally or partially also to the aluminum hydroxide of the dispersion prepared for the further intermediate prior to its calcination.

The magnesium added to the dispersion of the two intermediates assists in the formation of spinel crystallites on many, statistically uniformly distributed locations of the gamma-$Al_2O_3$ particle matrices. Regardless of when the magnesium is added to the dispersion, it is believed that in the dispersion or during dewatering, the magnesium ions become attached to the surface of gamma-$Al_2O_3$ crystals. This seems to stabilize the gamma-$Al_2O_3$ as a nucleating material that is particularly reactive upon heating for the transition to alpha $Al_2O_3$. Sometime before sintering, the stabilized $Al_2O_3$ particles form spinel distributed among gamma $Al_2O_3$ crystals. As the processing continues, at an increased temperature, e.g., starting at about 900° C., an earlier-than-expected transformation and conversion occurs, of the gamma $Al_2O_3$ in the second intermediate material and the first intermediate material not originally present in the gamma form, into alpha $Al_2O_3$. The transformation of gamma $Al_2O_3$ in the presence of the spinel, proceeds directly into alpha $Al_2O_3$ without passing through the delta and theta phases. Thus, the gamma $Al_2O_3$ particles with attached magnesium ions, may be viewed as providing a distribution of nucleating material for the formation of spinel and the direct transformation to alpha $Al_2O_3$ particles, accompanied by the rapid transformation of the other aluminum atoms of the first intermediate in the matrix to essentially pure alpha alumina as the matrix reaches the sintering temperature. The magnesium in the sintered product appears as spinel crystals discernible among crystals of alpha $Al_2O_3$.

The concentration of the magnesium salt is expediently chosen such that the molar ratio of magnesia to alumina amounts to about 12 to 50% depending on the physical properties of the abrasive desired.

The abrasive according to the invention does not exclude the presence of micropores, when these appear to be expedient with regard to the toughness. The abrasive according to the invention can be manufactured into a grinding tool in the customary manner either alone or as a mixture with other abrasives, for example electrocorundum abrasives. However, it can be also used without further processing or after comminution or agglomeration as blasting agents or as liquids or pastes for grinding or polishing.

EXAMPLE 1

1000 g of hydrated alumina of the type specified in greater detail below were uniformly dispersed in a container with 2000 ml of water and 21 ml of nitric acid (cHNO$_3$=16 mol/l) and the dispersion was the centrifuged at 6000 rpm and a centrifuge diameter of 280 mm. The resultant dispersion A had a 30.2% proportion of solids, a density of 1.235 g/ml and a dynamic viscosity of 100 mPa s.

The hydrated alpha-alumina (a type of aluminum hydroxide as that term is used herein) of the boehmite type used was that distributed by Condea-Chemie, Brunsbüttel, under the registered trade mark "Dispersal ALUMINAS"; it had the following properties:
Chemical composition:

| | | |
|---|---|---|
| $Al_2O_3$ | 72% | min. |
| C | 0.5% | max. |
| $SiO_2$ | 0.025% | max. |
| $Fe_2O_3$ | 0.020% | max. |
| $Na_2O$ | 0.005% | max. |

Physical properties:
 Specific surface area 160 m$^2$/g min.
 Bulk density 450 to 650 g/l
 Packing density 800 to 1000 g/l
Particle distribution:

| | |
|---|---|
| min. 40% below | 25 μm |
| min. 60% below | 45 μm |
| min. 85% below | 90 μm |
| min. 95% below | 200 μm |

Dispersibility:

| | |
|---|---|
| 10% in 0.35% HCl: | min. 97% |
| 30% in 1.20% HNO$_3$: | min. 92% |

EXAMPLE 2

100 g of the hydrated alumina specified in greater detail in Example 1 (i.e., a form of aluminum hydroxide) were calcined at 550° C. for one hour and subsequently uniformly dispersed in 500 ml of water and 5 ml of nitric acid (CHNO$_3$=16 mol/l), followed by the centrifugation as above. The resultant dispersion B had a solids content of 5%, a density of 1.050 g/ml and a viscosity of 13.5 mPa s.

EXAMPLE 3

1000 g of dispersion A (from Example 1) and 250 g of dispersion B (from Example 2) were mixed in a container to give dispersion C. This was used to produce continuously a gel by adding a solution of 95 g of magnesium nitrate and 150 g of water in a mixer. The gel was applied to an aluminum conveyor sheet in the form of a 10 mm thick layer and subsequently dried in a circulating air drying oven at 90° C. The period of drying in the circulating air oven was 36 hours. The mass ratio of dry gel to wet gel was 0.24.

The dry gel was crushed in a jaw crusher. The fine and the coarse components were separated by sieving. The useful particles with a maximum particle size of 980 μm were subjected to calcining in a muffle furnace heated to 550° C. The dehydration took place with evolution of steam and splitting off of NO$_x$ gases during a residence time of one hour.

The calcined particles were cooled to room temperature and introduced in a sintering oven heated to 1390° C. for sintering. The residence time was 5 minutes. The ready-sintered abrasive grain were subsequently sieved to standard grain size P 40 in accordance with DIN 69 176 part 2.

In the abrasive prepared in this manner the molar ratio of the alumina originating from the second intermediate in accordance with Example 2 to the total alumina content was 0.09. The molar ratio of MgO/$Al_2O_3$ was 0.27.

The density of the abrasive produced was 3.38 g/cm$^3$ and the Knoop hardness HK$_{100}$=16240 ±608 N/mm$^2$.

The grain toughness by the Battelle method using a ball mill gave a toughness value of lg z=2.74.

EXAMPLE 4

Grinding wheels made of vulcanized fibre were prepared using the abrasive grain obtained. The thickness of the vulcanized fibre wheel was 0.86 mm. The wheels were produced entirely from synthetic resins, with phenol-formaldehyde resin in the base coat and with a size coat filled up to 25% with chalk by the customary processes by hardening the base coat after applying the grain at 105° C. and by hardening the size coat at 125° C. The wheels had an outer diameter of 180 mm and a hole diameter of 22.2 mm. They were conditioned to a vulcanized fibre humidity of 6.5±0.5%.

Grinding tests using there vulcanized fibre grinding wheels were carried out on a standard test grinding machine. The end face of a tube made of thin steel sheet USt 12 in accordance with DIN 1203, with an inner diameter of 195 mm and wall thickness of 1 mm, rotating around its horizontal axis at a rate of 16 rpm, was ground in the test. The vulcanized fibre grinding wheels were mounted onto the plastic disc back-up pad of the grinding machine with an outer diameter of 172 mm and positioned at the axial heigth of the tube on one side of the latter, forming an angle of 24° with the tube end face. At the contact zone the vulcanized fibre disc was then positioned at the axial height of the tube in such a way that the circumference of the disc is roughly parallel with the tube radius. The nominal rate of rotation of the vulcanized fibre disc was 6000 rpm and the contact pressure $p=230$ N/cm$^2$.

After four grinding periods, each lasting one minute, the mean total removal rate was 177.4 g with a standard deviation of $\pm 6.8$ g.

Using the customary vulcanized fibre discs with the abrasive made of electrocorundum, the total removal rate under the same grinding conditions is 80–115 g at the end of the fourth grinding period. The improvements of the grinding performance of the abrasive according to the invention when compared with a customary one, amount therefore to 54–121%.

EXAMPLE 5

1000 g of dispersion A from Example 1 and 500 g of dispersion B from Example 2 were combined in a container to give dispersion C. From this a gel was continuously produced in a mixer by the addition of a solution of 96 g of magnesium nitrate and 150 g of water.

The gel was dried at 95° C. for 24 hours. The crushing and sieving of the particles as well as the calcining, sintering and classification of the abrasive and the production of the vulcanized fibre discs were carried out in the same manner as above in Examples 3 and 4. The abrasive produced had a molar ratio of alumina originating from the further intermediate (in accordance with Example 2) to the total alumina content of 0.16 and the molar ratio of MgO/Al$_2$O$_3$=0.25. The density of the abrasive produced was 3.75 g/cm$^3$ and the Knoop hardness HK$_{100}$=19520$\pm$1026 N/mm$^2$. The grain toughness by the Battelle method gave a toughness value lg $z=2.98$ for the abrasive prepared in accordance with this example.

The grinding tests with the vulcanized fibre discs of grain size P 40 prepared for this purpose were carried out using the standard test grinding machine described in Example 4 in the same manner. After four grinding periods, each lasting 1 minute, the mean total removal rate was 188.3 g with a standard deviation of $\pm 7.3$ g. The improvement of the grinding performance of the abrasive according to the invention when compared with the customary one using electrocorundum, amounts therefore to 63–135%.

Vulcanized fibre discs of grain size P 36 prepared according to this example, were additionally tested in a bar test; in this test, a steel bar of St 37 with a cross-section of 3$\times$10 mm$^2$ and 500 mm long was mounted perpendicularly to the grinding surface of the vulcanized fibre disc such that an annular grinding zone of a width of 5 mm and a mean diameter of 156 mm was produced. The rate of rotation was 4400 rpm.

The grinding period lasted 30 seconds. After 24.4 periods with a mean depth of cut per period of 0.34 mm, a total depth of cut of 8.32 mm was obtained. This corresponds to a grinding zone-related volume of abraded material of 0.832 cm$^3$/cm$^2$. A customary vulcanized fibre disc with electrocorundum of grain size P 36 failed after 6 30-second grinding periods and produced a total depth of cut of only 2.30 mm. In this more stringent test of grinding performance the grinding zone-related volume of abraded material was thus about 3.6 times higher than that furnished by a customary electrocorundum abrasive.

EXAMPLE 6

660 g of dispersion A from Example 1 and 3970 g of dispersion B from Example 2 were combined in a container to give dispersion C. From this a gel was continuously produced in a mixer by the addition of a solution of 726 g of magnesium nitrate and 1135 g of water. An abrasive was produced from this gel as described in Example 5. The molar ratio of the alumina originating from the further intermediate (in accordance with example 2) to the total alumina content was 0.70 and the molar ratio MgO/Al$_2$O$_3$=1.02. The alumina was thus completely converted to magnesium spinel. In addition a very small residue of magnesia remained. The density of the abrasive produced was 3.40 g/cm$^3$ and the Knoop hardness HK$_{100}$=24700 $\pm$2067 N/mm$^2$.

Example 7

156 g of dispersion A from Example 1 and 400 g of dispersion B from Example 2 were used as starting materials. The dispersion B was centrifuged with twice as great an amount diffused per unit of time as in Example 3; it was subsequently evaporated at a temperature of 90° to 95° C. to a solids content of 30% and cooled. The dispersion B was then mixed with a solution of 50 g of magnesium nitrate and 80 g of distilled water and, while adding the dispersion A and passing through the mixer, was introduced as a gel into the drier. Abrasives were produced by this process as described in Example 5. The molar ratio of alumina originating from the further stage to the total alumina content and the molar ratio MgO/Al$_2$O$_3$ were 0.50. The abrasive had a density of 3.27 g/cm$^3$ and a Knoop hardness HK$_{100}$=21000$\pm$1620 N/mm$^2$.

We claim:

1. A process for the production of a ceramic polycrystalline abrasive by the steps of dispersing a hydrated alumina in water followed by dewatering, calcining and sintering, wherein the improvement comprises:
   said step of dispersing includes forming a dispersion which simultaneously contains particles of aluminum hydroxide, particles of gamma phase alumina, and dissolved magnesium salt, and
   said step of forming a dispersion is followed by said steps of dewatering, calcining and sintering.

2. The process of claim 1, wherein the steps of forming a dispersion, dewatering, and calcining include said magnesium forming a spinel associated with gamma phase alumina.

3. The process of claim 1, wherein after the step of calcining, said magnesium has formed a spinel associated with gamma phase alumina.

4. The process of claim 1, wherein the step of forming a dispersion includes,
   forming a first dispersion in water of a first material containing particles of aluminum hydroxide, forming a second dispersion in water of a second material containing particles of gamma phase alumina, and combining the first and second dispersions.

5. The process of claim 4, wherein the step of forming a dispersion includes mixing dissolved magnesium salt in at least one of the first and second dispersions before the step of combining.

6. The process of claim 4 wherein the step of forming a dispersion includes adding a solution of magnesium nitrate and water to the combination of the first and second dispersions.

7. The process of claim 1, wherein the step of forming the dispersion includes mixing the aluminum hydroxide particles with the particles of gamma phase alumina and adding a magnesium salt during said mixing.

8. A process according to claim 1, characterized in that the particles of gamma phase alumina are contained in a calcined aluminum hydroxide not completely converted into alpha-alumina.

9. A process according to claim 1, characterized in that the particles of gamma phase alumina are ground before being dispersed with the particles of aluminum hydroxide and the dissolved magnesium salt.

10. A process according to claim 1, characterized in that the particles of aluminum hydroxide are a finely dispersed aluminum metahydroxide.

11. A process according to claim 1, characterized in that the particles of aluminum hyroxide are dispersed with the particles of gamma phase alumina in such a proportion that their contents of anhydrous aluminum oxide are, respectively, in the ratio from 99:1 to 80:20.

12. A process according to claim 1, characterized in that the proportion of aluminum in said particles of aluminum hydroxide and gamma phase alumina together, is at least 90%.

13. A process according to claim 12, characterized in that said proportion of aluminum is at least 99%.

14. A process according to claim 1, characterized in that the magnesium content in the dispersion of the particles of aluminum hydroxide and particles of gamma phase alumina corresponds to a molar ratio of MgO to $Al_2O_3$ of at least 0.1 in the sintered product.

15. A process according to claim 1, characterized in that the step of forming a dispersion is followed by the step of forming a gel, and the gel is extruded prior to dewatering.

16. A process for the production of ceramic polycrystalline corundum abrasive, comprising:

forming a dispersion in water, the dispersion containing particles of aluminum hydroxide, particles of gamma phase alumina, and magnesium ions, whereby said ions and particles of alumina form a nucleating material;

dewatering the dispersion to form a calcined matrix in which spinel is distributed at the nucleating material; and heating the calcined matrix to transform the gamma phase alumina into alpha phase alumina.

17. The process of claim 16, wherein the step of heating the calcined matrix includes heating the matrix to a temperature in the range of 1250°–1450° C.

18. The process of claim 16, wherein the duration of said heating is between 5 and 90 minutes.

19. The process of claim 16, wherein the magnesium salt is magnesium nitrate.

20. A process according to claim 10, characterized in that the aluminum metahydroxide belongs to the boehmite type.

* * * * *

UNITED STATES PATENT AND TRADEMARK OFFICE
CERTIFICATE OF CORRECTION

PATENT NO. : 5,034,360
DATED : July 23, 1991
INVENTOR(S) : Gunter Bartels et al

It is certified that error appears in the above-identified patent and that said Letters Patent is hereby corrected as shown below:

Column 10, line 8 of Claim 15, "dewatering" should be --dehydrating-- .

Signed and Sealed this

Sixth Day of April, 1993

Attest:

STEPHEN G. KUNIN

Attesting Officer

Acting Commissioner of Patents and Trademarks